United States Patent
Martinez et al.

(10) Patent No.: US 10,627,627 B2
(45) Date of Patent: Apr. 21, 2020

(54) EYE TRACKING USING LIGHT GUIDE WITH FACETED COMBINER

(71) Applicant: GOOGLE LLC, Mountain View, CA (US)

(72) Inventors: Oscar Martinez, Mountain View, CA (US); Chien-Hung Lu, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 154 days.

(21) Appl. No.: 15/722,661

(22) Filed: Oct. 2, 2017

(65) Prior Publication Data

US 2019/0101757 A1  Apr. 4, 2019

(51) Int. Cl.
| | | |
|---|---|---|
| G02B 27/01 | (2006.01) | |
| G02B 27/00 | (2006.01) | |
| G06F 3/01 | (2006.01) | |
| G02B 27/14 | (2006.01) | |

(52) U.S. Cl.
CPC ..... *G02B 27/0172* (2013.01); *G02B 27/0093* (2013.01); *G06F 3/013* (2013.01); *G02B 27/0101* (2013.01); *G02B 27/141* (2013.01); *G02B 2027/0125* (2013.01); *G02B 2027/0178* (2013.01); *G02B 2027/0187* (2013.01)

(58) Field of Classification Search
CPC .... G02B 2027/0125; G02B 2027/0178; G02B 2027/0187; G02B 27/0093; G02B 27/0101; G02B 27/0172; G02B 27/141; G02B 6/0035; G02B 27/30; G02B 6/0026; G06F 3/013; A61B 3/12; G02F 1/133615
See application file for complete search history.

(56) References Cited

U.S. PATENT DOCUMENTS

| | | | |
|---|---|---|---|
| 6,671,100 B1 | 12/2003 | McRuer | |
| 8,662,686 B2 | 3/2014 | Takagi et al. | |
| 9,915,823 B1* | 3/2018 | Kress | G02B 27/0172 |
| 10,088,685 B1* | 10/2018 | Aharoni | G02B 27/0172 |
| 2012/0057253 A1* | 3/2012 | Takagi | G02B 27/0172 |
| | | | 359/861 |
| 2015/0378161 A1* | 12/2015 | Bailey | G02B 27/30 |
| | | | 345/8 |

(Continued)

OTHER PUBLICATIONS

International Search Report and Written Opinion dated Oct. 5, 2018 for corresponding International Application No. PCT/US2018/041925, 17 pages.

*Primary Examiner* — Richard J Hong

(57) ABSTRACT

An eye tracking system includes a light guide comprising a first eye-facing surface, a second surface, a third surface, and a plurality of facets formed in the second surface. The facets reflect a portion of light incident on a user eye into the light guide, which is positioned proximate to the user eye and between the user eye and a display. A surface of a compensator may be shaped complementary to the second surface of the light guide and placed proximate to the light guide. A camera or image sensor is oriented toward the third surface of the light guide and captures an image based on internally reflected light. An IR light source may be included. The image sensor may be an IR image sensor. Based on the image, a pose of the user eye is determined. A faceted light guide assembly may include a reflective coating adjacent the facets.

27 Claims, 13 Drawing Sheets

(56) References Cited

U.S. PATENT DOCUMENTS

| | | |
|---|---|---|
| 2016/0357016 A1 | 12/2016 | Cakmakci et al. |
| 2017/0147859 A1 | 5/2017 | Zhang et al. |
| 2017/0329137 A1* | 11/2017 | Tervo .................. G02B 6/0026 |
| 2017/0343797 A1* | 11/2017 | Bailey .................... G02B 27/30 |
| 2018/0173057 A1* | 6/2018 | Choi ................. G02F 1/133615 |
| 2019/0049739 A1* | 2/2019 | Choi .................... G02B 6/0035 |
| 2019/0056600 A1* | 2/2019 | Danziger ................. A61B 3/12 |

* cited by examiner

CONVENTIONAL EYE TRACKER
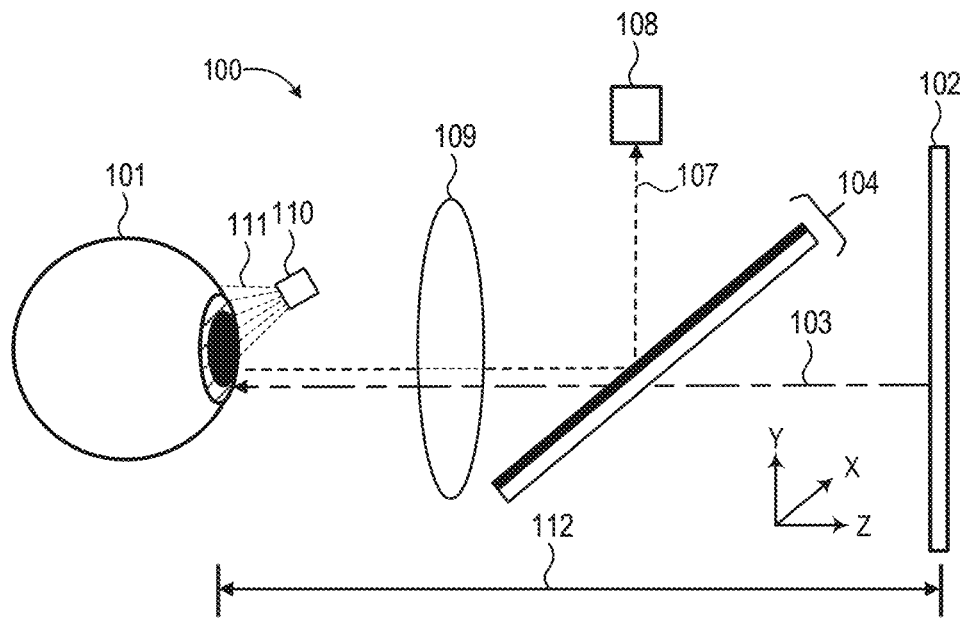
EYE TRACKER USING FACETED LIGHT GUIDE
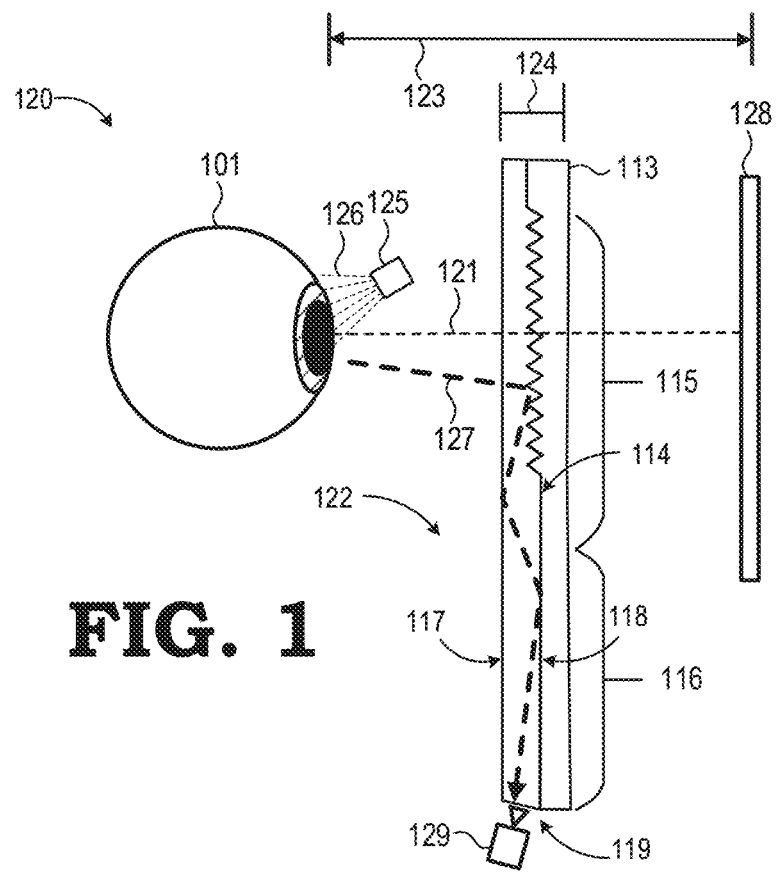
FIG. 1

| Variation | Thickness | Parallel Facets | Facet Pitch | FOV Gap Width @ 19mm ER | Field of View (FOV) Coverage | | |
|---|---|---|---|---|---|---|---|
| | | | | | 10 mm ER | 19 mm ER | 28 mm ER |
| 1 | 2.0 mm | Yes | 1.4 mm | ~1.2 mm | 30% | 36% | 40% |
| 2 | 2.5 mm | No | 1.4 mm | ~0.45 mm | 44% | 65% | 89% |
| 3 | 3.5 mm | Yes | 1.3 mm | ~0.8 mm | 57% | 63% | 71% |
| 4 | 2.5 mm | Yes | 1.4 mm | ~1.0 mm | 42% | 47% | 54% |
| 5 | 3.5 mm | No | 1.3 mm | ~0.32 mm | 68% | 85% | 96% |
| 6 | 2.5 mm | No | 1.0 mm | 0.0 mm | 86% | 100% | 100% |

FIG. 13

EYE TRACKING USING LIGHT GUIDE WITH FACETED COMBINER

BACKGROUND

Field of the Disclosure

The present disclosure relates generally to near-eye displays and, more particularly, to eye tracking in near-eye displays.

Description of the Related Art

Head mounted display (HMD) devices and other near-eye display devices typically use one or more display panels mounted in front of a user's eyes to display various types of content, including virtual reality (VR) content, augmented reality (AR) content, and the like. In many instances, such near-eye display systems employ eye tracking to provide an enhanced user experience. Conventional eye tracking mechanisms typically employ a complex arrangement of lenses and mirrors to capture an image of the eye, and from this image estimate a gaze direction of the eye. However, the complex optical mechanism required in conventional systems to provide this eye tracking function without occluding the display panel often inhibits implementation of a small form factor for near-eye display devices.

BRIEF DESCRIPTION OF THE DRAWINGS

The present disclosure may be better understood and its numerous features and advantages made apparent to those skilled in the art by referencing the accompanying drawings. The use of the same reference symbols in different drawings indicates similar or identical items.

FIG. 1 is a diagram illustrating a cross-section view of an eye-tracking system employing a faceted light guide assembly in accordance with some embodiments.

FIG. 13 illustrates a table of example values of system aspects and respective values for field of view (FOV) coverage for implementations of light guides as described herein.

DETAILED DESCRIPTION

Figure 2:
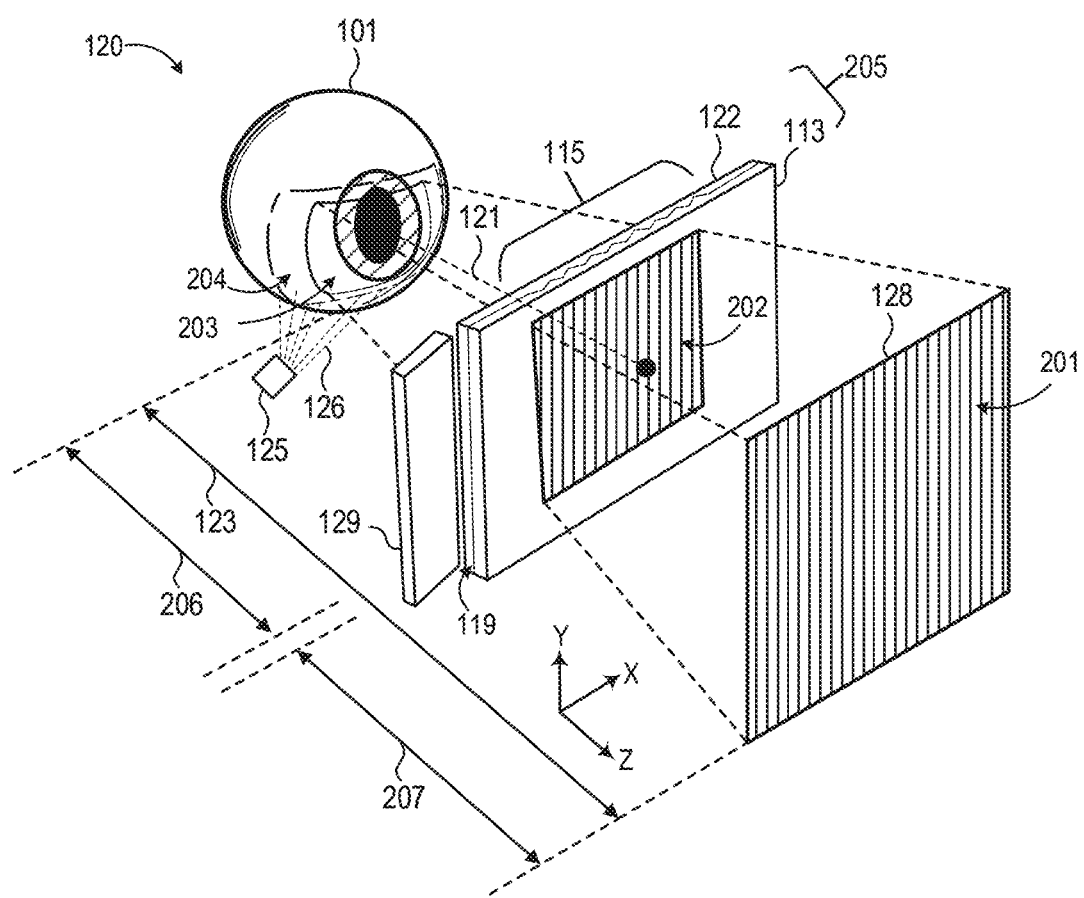
FIG. 2 is a diagram illustrating a perspective view of the eye tracking system employing a faceted light guide assembly illustrated in FIG. 1 in accordance with some embodiments.

FIGS. 1-15 illustrate example methods and systems for determining eye pose based on one or more eye images of one or both user eyes captured by an imaging sensor or a camera positioned proximate to a light guide. A near-eye display system, such as a head-mounted display (HMD) device, positions a light guide between a user eye and at least one display panel. In at least one embodiment, a faceted light guide assembly includes a light guide comprising a transparent body, a first surface, a second surface opposite the first surface, and a third surface substantially orthogonal to the first surface. The first surface may be substantially planar surface. The second surface includes a combiner region having a plurality of facets generally arranged along a plane. According to one implementation, the plane has a non-zero angle relative to the first surface. The facets are configured to reflect light internally through the body of the light guide toward the third surface of the light guide. The reflected light is incident on a corresponding region of the first surface as it passes into the light guide.

The near-eye display system further includes an image sensor disposed at the third surface of the light guide, and which is configured to capture imagery representative of light reflected from the eye, incident on the eye-facing surface of the light guide, and internally reflected by the facets of the combiner region toward and through the third surface. A processor executing a program can determine a current pose of the user eye from this captured imagery using any of a variety of eye-tracking algorithms, and from this current pose of the user eye, the processor can control one or more aspects of the operation of the near-eye display system. Use of the faceted light guide described herein shrinks the distance between a lens and a near-eye display. The light guide includes facets that direct light such as infra-red light into the body of the light guide. Images of the eye are captured outside a field of view of the eye according to some embodiments. The reduced distance between the lens and the near-eye display reduced a perceived weight and awkwardness associated with the head-mounted apparatus thereby providing an improved virtual reality (VR) or augmented reality (AR) experience.

FIG. 1 is a diagram illustrating a cross-section view of an eye-tracking system employing a faceted light guide assembly in accordance with some embodiments.

The depicted conventional eye-tracking system 100 includes an eye 101 viewing a display panel 102 by absorbing visible light 103 passing through a hot mirror 104 and a lens 109 such as along a z-axis. The hot mirror 104 is configured so as to reflect light in a certain spectrum (typically the near-infrared spectrum) while allowing light outside that spectrum (that is, visible light) to pass through. A light source 110 may be arranged proximate to the system 100 and provides light 111 such as IR light that provides increased illumination of the eye 101 for the image sensor 108. IR light typically includes light of wavelength from about 750 to 1250 nanometers (nm). The image sensor 108 is positioned to receive IR light 111 reflected off of the eye 101 and reflected by the hot mirror 104. The image sensor 108 captures one or more images of the eye 101 as represented by the IR light 107. As shown in FIG. 1, the hot mirror 104 is typically placed at or near a 45-degree angle relative to the optical axis of the eye 101 when facing directly forward so as to permit the image sensor 108 to be positioned outside of the field of view (FOV) of the eye 101. This angled arrangement of the hot mirror 104 requires a substantial viewing distance 112 between the eye 101 and the display panel 102. Consistent therewith, a conventional head mounted display (HDM) must be large enough to accommodate the hot mirror 104 that encompasses a substantial portion or the entire field of view of each eye.

In contrast to a conventional eye tracking system, the eye tracking system 120 includes a faceted light guide 122 rather than a hot mirror. The light guide 122 includes a first eye-facing surface 117 and second surface 118. The light guide 122 includes a plurality of facets 114 formed in the second surface 118, each facet 114 angled greater than zero degrees away from a plane of the light guide 122. The facets 114 reflecting light 127 coming from a surface of the eye 101 into the body of the light guide 122 and toward a third side 119 of the light guide 122. According to one embodiment, the third side 119 may be non-orthogonal to either the first side 117 or the second side 118. An image sensor 129 is positioned proximate to the third side 119 of the light guide 122. The image sensor 129 may be an IR image sensor configured to capture images of the eye 101 within a range of wavelengths of IR light. Other types of light and other types of image sensors may be used. Other components for use with the image sensor 129 such as a lens, lens group, one or more electronic circuits, a camera shutter, and image processing circuitry may also accompany the image sensor 129 positioned proximate to the third side 119 of the light guide 122, but are omitted from FIG. 1 for sake of clarity. The facets 114 of the light guide 122 are formed over a combiner region 115. Light 127 is reflected from the combiner region 115 through or along a second region 116 of the light guide 122.

A compensator 113 is positioned proximate to the light guide 122. A portion of the compensator 113 can be shaped complementarily to the facets 114 so as to make an apparatus or light guide lens that is substantially uniform in thickness 124 according to an embodiment. In other embodiments, the thickness of the faceted light guide assembly varies as measured between the first side 117 and the second side 118. According to one example, the combination of the light guide 122 and the compensator 113 forms a zero-magnification element of the system 120 so as to provide substantially unaltered viewing experience through the second system 120. According to another example, the combination of the light guide 122, the compensator 113, and other non-illustrated translucent viewing elements, provide zero-magnification viewing.

The second system 120 may include a light source 125 that provides light 126 such as IR light to the eye 101 to facilitate imaging of the eye 101 via the image sensor 129. Generally, the light guide 122 may be placed parallel with the display panel 128 as indicated by the optical axis 121 that is perpendicular to the display panel 128. Alternatively, the light guide 122 may be placed at an angle to the display panel 128. Use of the light guide 122 facilitates a reduced viewing distance 123 compared to use of elements illustrated in the first system 100. That is, the light guide 122 and the image sensor 129 are configured to reduce an eye tracking distance between the eye 101 and the display panel 102.

FIG. 2 is a diagram illustrating a perspective view of the eye tracking system employing a faceted light guide assembly illustrated in FIG. 1 in accordance with some embodiments. In the depicted example, display content 201 of a display panel 128 is projected toward the eye 101. The content 201 is within the field of view (FOV) of the eye 101. In at least one embodiment, when the eye 101 is at rest (that is, facing directly forward toward the display panel 128), the optical axis 121 is within the field 202 of the content 201, the field 202 at a position within the combiner region 115 of the light guide 122. Elements including the light guide 122, the compensator 113, the light source 110, and the image sensor 129 comprise a faceted light guide assembly 205. The capturing images of the eye 101 include the image sensor 129. While the image sensor 129 is shown to a side of the eye 101, the image sensor 129 may be placed at another location relative to the eye 101 such as below the eye 101 and below the display panel 102 by rotating the light guide 122 and the compensator 113, and by moving the image sensor 129 yet maintaining the image sensor proximate the third side 119 of the light guide 122.

As projected on the eye 101, the content 201 from the display panel 102 reaches a first region 203 on the eye 101. In at least one embodiment, the image sensor 129 captures at least portions of a second region 204 illustrated in FIG. 2 that is larger than the first region 203. In other embodiments, the second region 204 may be a same size as, or smaller than, the first region 203.

The viewing distance 112 includes an eye relief distance 206 and a screen distance 207 between a surface of the compensator 113 and the display panel 102. One or more aspects of the light guide 122 and of the facets of the light guide 122 can be selected to create a desired size of the second region 204 or FOV coverage of the eye 101. Further, one or more aspects of the light guide 122 and of the facets of the light guide 122 can be selected based on one or more of the eye relief distance 206, the screen distance 207, an orientation of the display panel 102 relative to the eye 101, a position of the light guide 122 relative to the eye 101, an orientation of the light guide 122 relative to the eye 101, and other aspects of the system 120 such as a desired size and a desired location of the second region 204. As illustrated in FIG. 2, the facets within the combiner region 115 extend from a top side to a bottom side of the light guide 122. In other embodiments, facet surfaces of one or more facets extend a partial distance from top to bottom of the light guide 122. One or more of the facets may be positioned within or outside of a field of view (FOV) of the user eye 101.

Figure 3:
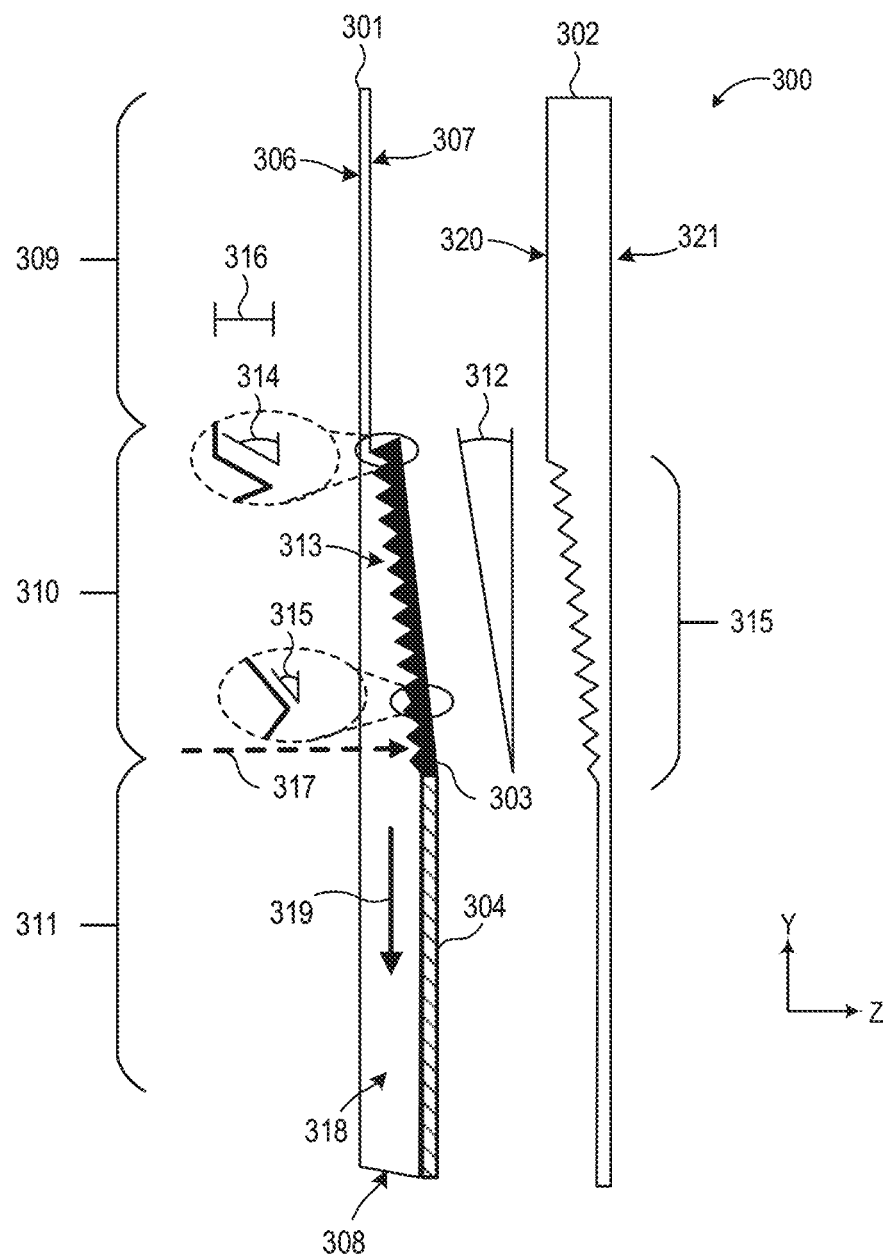
FIG. 3 is a diagram illustrating an exploded cross-section view of a faceted light guide assembly in accordance with some embodiments.

FIG. 3 is a diagram illustrating an exploded cross-section view of a faceted light guide in accordance with some embodiments. In FIG. 3, a faceted light guide assembly 300 includes a faceted light guide 301, a compensator 302, a first material 303, and a second material 304. Each of these elements 301-304 is further described.

The light guide 301 includes at least a first surface 306, a second surface 307, and a third surface 308. The light guide 301 includes three regions that differ with respect to at least the second surface 307: a first thinner upper region 309 lying in a first plane, a third lower region 311 in a second plane substantially parallel but offset to the first plane, and a middle region 310 that connects the upper region 309 with the lower region 311 along a third plane at an angle 312 with respect to the first plane and the second plane. The angle 312 is shown in FIG. 3 as uniform over the middle region 310. The angle 312 may be uniform over the middle region 310 in at least one embodiment. In other embodiments, the angle 312 may vary one, two, or more times over the middle region 310 such as measured through pairs of vertices of adjacent facets or measured at respective pairs of points on the second surface 307 of the middle region 310.

In the second surface 307 of the middle region 310 of the light guide 301 is a set of facets 313. As shown in FIG. 3, each of the facets 313 are of a same shape and a same size as each other facet 313 according to one embodiment. In other embodiments, each facet 313 of the set of facets may have one or more facet features that are distinct from one or more of the other facets 313. For example, a first facet may include a first facet angle 314 that differs from a second facet angle 315 of a second facet. According to one example embodiment, each facet includes a facet angle and a facet pitch 316 being a distance from a vertex between two facets as measured perpendicularly from the second plane of the second surface 307 of the light guide 301.

As another example embodiment, each facet includes a facet plane. Each facet plane is parallel to one or more other facet planes. As yet another example, each facet plane may be non-parallel to one or more other facet planes in an x-, y-, and z-orientation relative to a plane of the light guide 301.

While each facet 313 is illustrated in FIG. 3 as planar, such is not required in every embodiment. In some embodiments, each facet 313 includes a non-planar curvilinear aspect along one or more of the x-, y-, and z-axes. The facets 313 reflect incoming light 317 into the body 318 of the light guide 301 in a direction toward the third surface 308. A portion of the third surface 308 may be formed into an end facet that is shaped for directing light to a surface of an image sensor.

In FIG. 3, the faceted light guide assembly 300 includes the first material 303 positioned adjacent the middle region 310 of the light guide 301. According to an example embodiment, the first material 303 is an IR reflective coating. According to another example embodiment, the first material 303 is an IR reflective material added to the middle region 310 during formation of the light guide 301. According to yet another example embodiment, the first material 303 is a film applied to the second surface 307 in the middle region 310 of the light guide 301. Examples of the first material 303 include a multi-layer dielectric thin film coating that includes $SiO_2$ or $TiO_2$. Metal layers can also be used such as aluminum. Examples of materials for making the light guide 301 include Zeonex E48R, EP5000, and polycarbonate.

The faceted light guide assembly 300 also includes the second material 304 positioned adjacent the lower region 311 of the light guide 301. The second material 304 enhances internal reflection of energy in the body 318 of the light guide 301 in the direction 319 indicated. According to an example embodiment, the second material 304 is an IR reflective coating. According to other example embodiments, the second material 304 is one of a multilayer IR reflective coating, an IR reflective material added to the lower region 311 during formation of the light guide, an IR reflective film applied to the second surface 307 in the lower region 311 of the light guide 301, a single low-index chiolite-based coating on the second surface 307 in the lower region 311 of the light guide 301, and a dichroic reflective material applied to the second surface 307 in the lower region 311 of the light guide 301. Examples of the second material 304 further include a total internal reflector applied to a first side 320 of the compensator 302 such as a multi-layer dielectric thin film coating made of $SiO_2$ or $TiO_2$. Reflection at 304 can also occur from the use of a low index adhesive to bond 301 and 302. It is also possible to omit any coatings on 304, and use total internal reflection on surface 321.

In FIG. 3, the faceted light guide assembly 300 also includes the compensator 302. According to one example embodiment, the compensator 302 is formed of a same material as the light guide 301 and shaped to complementarily match the shape and contours of the light guide 301, the first material 303, and the second material 304 when all are assembled together thereby forming a composite optical element.

Figure 4:
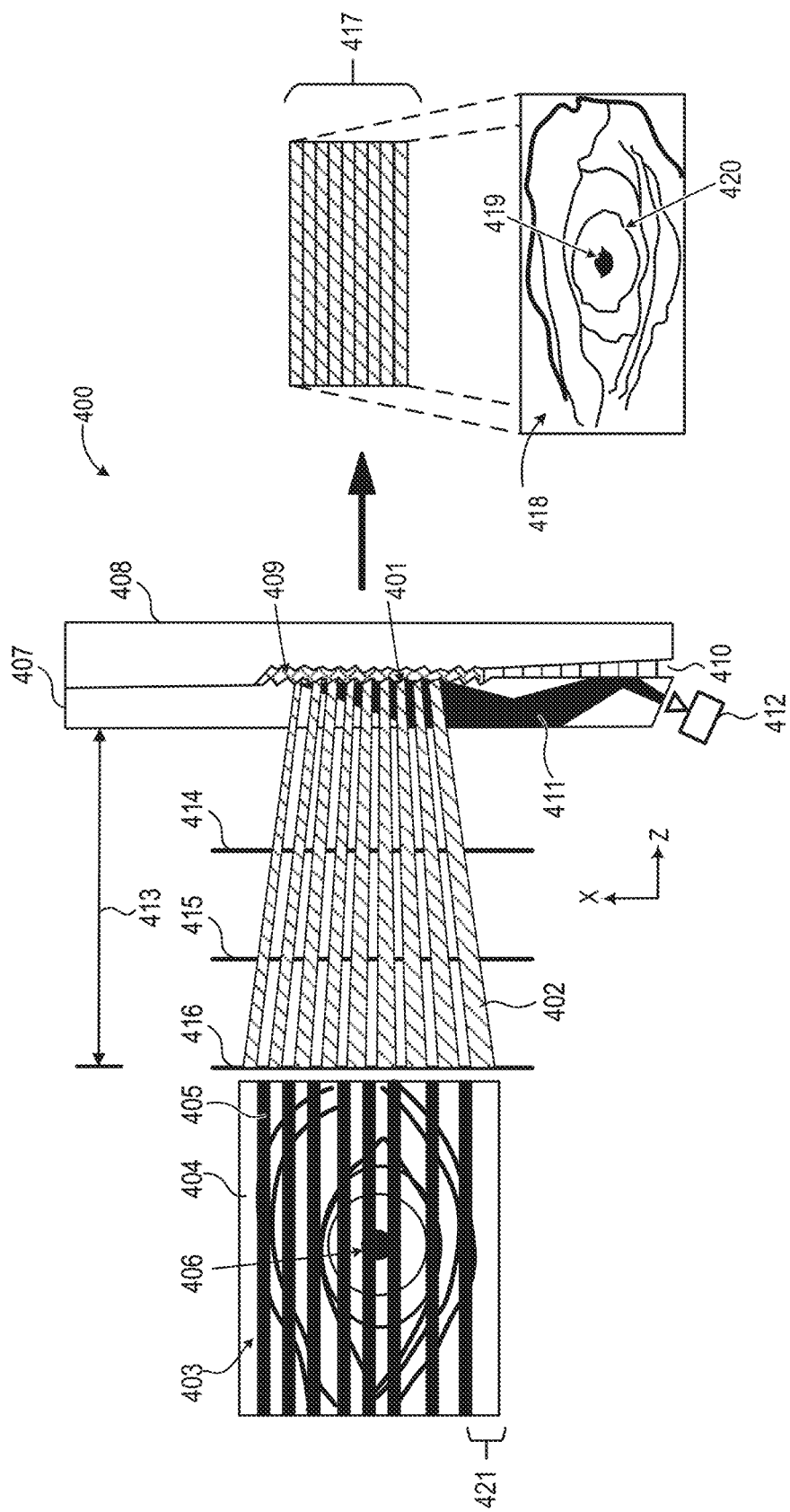
FIG. 4 is a diagram illustrating generation of an image of a user eye from reflections from a plurality of facets of a light guide in accordance with some embodiments.

FIG. 4 is a diagram illustrating generation of an image of a user eye from reflections from a plurality of facets of a light guide in accordance with some embodiments. In FIG. 4, a light guide 407 has facets 401 in one of its surfaces. Light 402 such as IR light from a scene 403 of a user eye 406 is reflected by facets 401. Light 402 is only from certain bands 404 of the scene 403. Reflected regions of the scene 403 that are not captured by an image sensor 412 are illustrated as black bands 405. Certain light 402 from the scene 403 becomes internally reflected light 411 and is, in turn, captured by the image sensor 412. Each facet 401 reflects light and services a portion of the field of view (FOV) of the image sensor 412.

A width 421 of each captured band 404 is dependent on one or more features or elements of the system 400. For example, the width 421 of each band 404 depends on a respective facet angle and an eye relief distance 413 of the scene 403 from a first eye-facing surface of the light guide 407. An object plane is formed by the system 400 at the eye relief distance 413. The eye relief distance 413 may be a first eye relief distance 414, a second eye relief distance 415, a third eye relief distance 416, and so forth. A position along an x-axis and the facet angle of each facet determine where a corresponding portion of the FOV of the image sensor 412 and scene 403 is reflected within the body of the light guide 407.

Light 402 is reflected by the facets 401 of the light guide 407. The light guide 407 may be combined with a compensator 408, a first reflective material 409, and second reflective material 410 according to at least one embodiment. The compensator 408 facilitates reduction in distortion of visible light reaching the user eye 406 passing through, in order, the combination of the compensator 408, the first material 409, and the light guide 407. The first reflective material 409 facilitates reflection of the light 402 coming from the scene 403 into the body of the light guide 407. For light 402 that is IR light, the first material 409 allows visible light to pass through the material 409 in both directions. The second reflective material 410 facilitates reflection of the light along and within the body of the light guide 407 as the light travels along the body of the light guide 407 toward the image sensor 412.

The image sensor 412 transforms the reflected light bands 404 into a set of captured data bands 417 as part of an electronic image—a composite image 418. The composite image 418 reflects that only certain bands 404 of the scene 403 are captured; the composite image 418 includes distortions based on capturing only the certain bands 404. The composite image 418 represents a certain coverage area or coverage area percentage of the original scene 403. For example, at the first eye relief distance 414 a first percentage of the scene 403 is captured in the composite image 418. As another example, at the second eye relief distance 415 a second percentage of the scene 403 is captured in the composite image 418. As yet another example, at the third eye relief distance 416 a third percentage of the scene 403 is captured in the composite image 418, and so forth. The first percentage can be less than, the same as, or more than the second percentage and the third percentage depending on one or more aspects of the system 400 including aspects of the facets 401.

A set of executable instructions may be executed to identify one or more eye features within the composite image 418 to facilitate eye tracking. For example, an edge of an eye pupil 419 may be identified according to an embodiment. As another example, an edge of an eye proximate to an eyelid 420 may be identified according to an embodiment.

Figure 5:
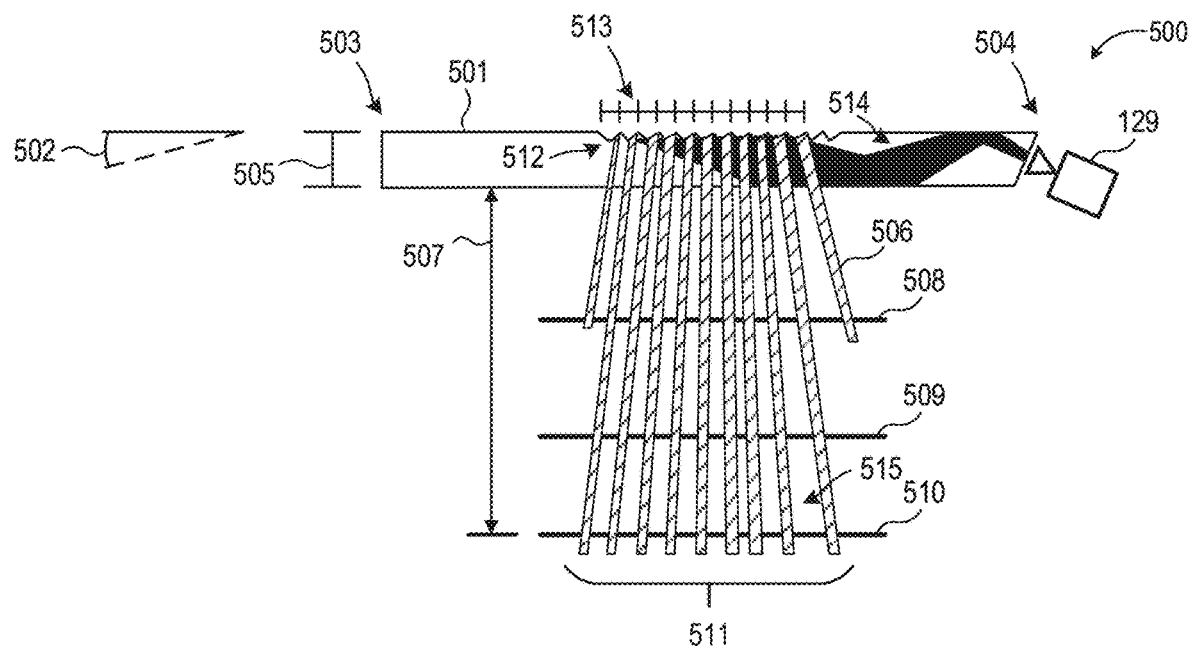
FIG. 5 is a diagram illustrating a light guide having facets of a uniform aspect in accordance with some embodiments.

FIG. 5 is a diagram illustrating a light guide having facets of a uniform aspect in accordance with some embodiments. FIG. 5 illustrates a system 500 that includes a light guide 501 that has a zero-degree angle 502. For sake of simplicity of illustration, elements such as one or more coatings and a compensator are omitted but may be included with the light guide 501 to form a faceted light guide assembly. In FIG. 5, the light guide 501 has a substantially uniform thickness 505 from a first end 503 to a second end 504 of the light guide 501. As an example, the thickness 505 is between 0.5 mm and 4.0 mm such as 1.5 mm, 2.0 mm, 2.5 mm, 3.0 mm, and 3.5 mm. The light guide 501 includes a plurality of facets 512. Each facet 512 has one or more uniform aspects. For example, each facet 512 has a same facet angle 513 and a uniform facet width.

The facets 512 direct light streams 506 from a scene into the body 514 of the light guide 501. The image sensor 129 captures the internally reflected light. The internally reflected light may be IR light, ultraviolet light, and so forth. An image based on the light streams 506 is dependent on an eye relief distance 507 from a first surface of the light guide 501. The eye relief distance 507 may be a first eye relief distance 508, a second eye relief distance 509, a third eye relief distance 510, and so forth. By way of example, the first eye relief distance 508 is approximately 10 mm, the second eye relief distance 509 is approximately 19 mm, and the third eye relief distance 510 is approximately 28 mm. According to some implementations, the combiner region of a light guide is positioned within at least 25 mm of a surface of a user eye.

At each eye relief distance 507, a certain percentage of the original scene is captured by the image sensor 129 by the collection 511 of the light streams 506. In the configuration illustrated in FIG. 5, the percentage at each eye relief distance 507 is less than 100 percent due to gaps or spaces 515 between adjacent lights streams 506. The gaps 515 represent light from the scene which is not directed onto the imaging sensor 129. Non-captured light passes through the light guide 501, is scattered or is otherwise lost. By way of example, the percentage of coverage at the second eye relief distance 509 is approximately 36 percent at a light guide thickness 505 of 2.0 mm. Other captured percentages based on the faceted light guide assembly 500 of FIG. 5 are possible based on adjusting one or more aspects in view of exigent circumstances related to the scene to be captured.

Figure 6:
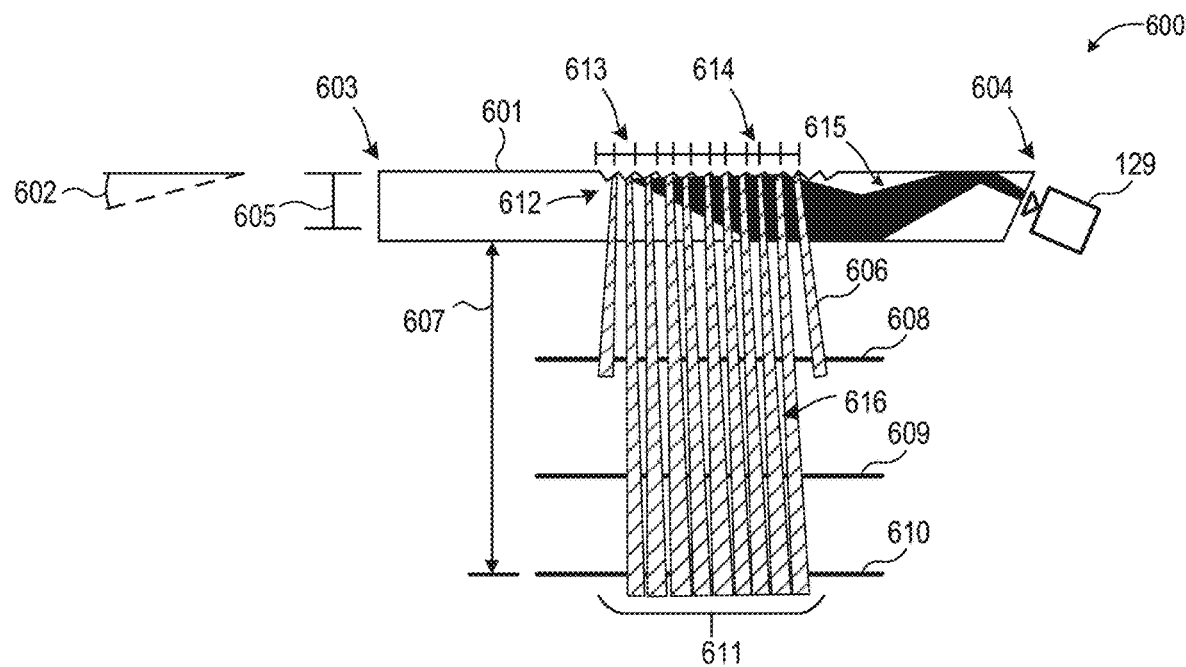
FIG. 6 is a diagram illustrating a light guide having facets of a non-uniform aspect in accordance with some embodiments.

For example, FIG. 6 illustrates another system 600 having facets of a non-uniform aspect in accordance with some embodiments. The system 600 includes a light guide 601 that has a zero-degree angle 602 along a combiner region as measured from a surface of the light guide 601. For sake of simplicity of illustration, elements such as one or more coatings and a compensator are omitted but may be included with the light guide 601 to form a faceted light guide assembly. In FIG. 6, the light guide 601 has a substantially uniform thickness 605 from a first end 603 to a second end 604 of the light guide 601. As an example, the thickness 605 is between 0.5 mm and 4.0 mm such as 1.5 mm, 2.0 mm, 2.5 mm, 3.0 mm, and 3.5 mm. The light guide 601 includes a plurality of facets 612. Each facet 612 has one or more non-uniform aspects. For example, each facet 612 has a different facet angle or a non-uniform facet width. In FIG. 6, a first facet 613 has a first facet angle greater than a second facet angle of a second facet 614.

The facets 612 direct light streams 606 from a scene into the body 615 of the light guide 601. The image sensor 129 captures the internally reflected light. The internally reflected light may be IR light, ultraviolet light, and so forth. An image based on the light streams 606 is dependent on an eye relief distance 607 from a first surface of the light guide 601. The eye relief distance 607 may be a first eye relief distance 608, a second eye relief distance 609, a third eye relief distance 610, and so forth. By way of example, the first eye relief distance 608 is approximately 10 mm, the second eye relief distance 609 is approximately 19 mm, and the third eye relief distance 610 is approximately 28 mm.

At each eye relief distance 607, a certain percentage of the original scene is captured by the image sensor 129 by the collection 611 of the light streams 606. In the configuration illustrated in FIG. 6, the percentage at each eye relief distance 607 is less than 100 percent due to gaps or spaces 616 between adjacent lights streams 606. The gaps 616 represent light from the scene directed toward the light guide 601 but which is not reflected by the facets 612. By way of example, the percentage of coverage at the second eye relief distance 609 is approximately 65 percent at a light guide thickness 605 of 2.5 mm. Other captured percentages based on the system 600 of FIG. 6 are possible based on adjusting one or more aspects of the system 600 in view of exigent circumstances related to the scene to be captured.

Figure 7:
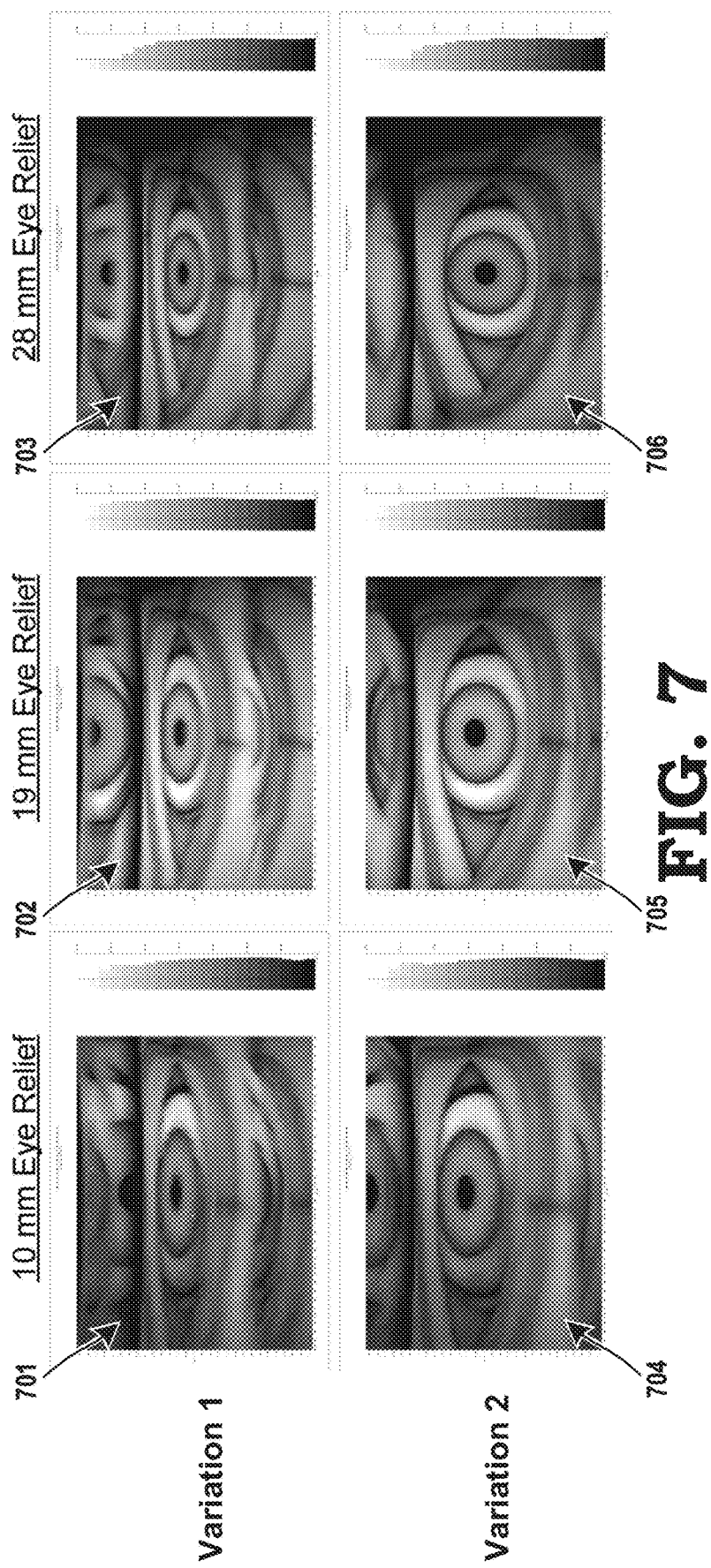
FIG. 7 illustrates example grayscale images captured using implementations of the faceted light guides of FIGS. 5 and 6.

FIG. 7 illustrates example grayscale images captured using implementations of the faceted light guides of FIGS. 5 and 6. Images 701, 702, and 703 are for variation 1 corresponding to an embodiment of the system 500 of FIG. 5. Images 704, 705, and 706 are for variation 2 corresponding to an embodiment of the system 600 of FIG. 6. Refer to FIG. 13 for a summary of variations 1 and 2.

In FIG. 7, a first image 701, a second image 702, and a third image 703 are captured by the system 500 of FIG. 5. The light guide 501 has a light guide thickness 505 of 2.0 mm, substantially parallel facet angles, and a facet pitch of 1.4 mm. The system 500 generates a FOV gap width of approximately 1.2 mm at 19 mm eye relief (ER). The first image 701 illustrates a FOV coverage of 30 percent at 10 mm ER. The second image 702 illustrates a FOV coverage of 36 percent at 19 mm ER. The third image 703 illustrates a FOV coverage of 40 percent at 28 mm ER.

A fourth image 704, a fifth image 705, and a sixth image 706 are captured by the system 600 of FIG. 6. The light guide 601 has a light guide thickness 605 of 2.5 mm, substantially non-parallel facet angles, and a facet pitch of 1.4 mm. The system 600 generates a FOV gap width of approximately 0.45 mm at 19 mm ER. The fourth image 704 illustrates a FOV coverage of 44 percent at 10 mm ER. The fifth image 705 illustrates a FOV coverage of 65 percent at 19 mm ER. The sixth image 706 illustrates a FOV coverage of 89 percent at 28 mm ER.

Figure 8:
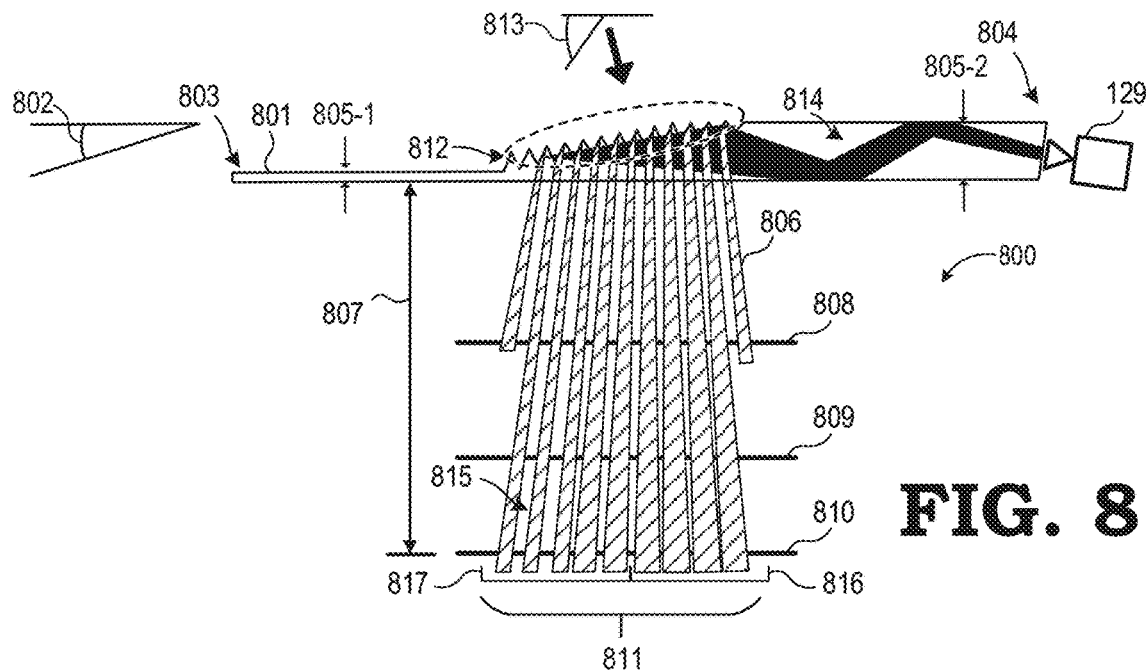
FIG. 8 is a diagram illustrating a light guide having facets of a uniform aspect, and where the facets are in a combiner region that is oriented at a non-zero angle in accordance with some embodiments.

FIG. 8 is a diagram illustrating a light guide having facets of a uniform aspect, and where the facets are in a combiner region that is oriented at a non-zero angle in accordance with some embodiments. FIG. 8 illustrates a system 800 that includes a light guide 801 that has a non-zero angle 802. For sake of simplicity of illustration, elements such as one or more coatings and a compensator are omitted but may be included with the light guide 801 to form a faceted light guide assembly. In FIG. 8, the light guide 801 has a first thickness 805-1 along a first end 803, a generally tapered thickness along a combiner region, and a second thickness 805-2 along a second end 804. As an example, the first thickness 805-1 is less than approximately 0.5 mm, and the second thickness 805-2 has a greater thickness than the first thickness 805-1 such as 1.0 mm, 1.5 mm, 2.0 mm, 2.5 mm, 3.0 mm, 3.5 mm, 4.0 mm, 4.5 mm, 5.0 mm, 7.5 mm, and 10.0 mm. The light guide 801 includes a plurality of facets 812. In FIG. 8, each facet 812 has one or more uniform aspects. For example, each facet 812 has a same facet angle 813. Alternatively, each facet 812 has a uniform facet width.

The facets 812 direct light streams 806 from a scene into the body 814 of the light guide 801. The image sensor 129 captures the internally reflected light. The internally reflected light may be IR light, ultraviolet light, and so forth. An image based on the light streams 806 is dependent on an eye relief distance 807 from a first surface of the light guide 801. The eye relief distance 807 may be a first eye relief distance 808, a second eye relief distance 809, a third eye relief distance 810, and so forth. By way of example, the first eye relief distance 808 is approximately 10 mm, the second eye relief distance 809 is approximately 19 mm, and the third eye relief distance 810 is approximately 28 mm.

At each eye relief distance 807, a certain percentage of the original scene is captured by the image sensor 129 by the collection 811 of the light streams 806. In the configuration illustrated in FIG. 8, the percentage at each eye relief distance 807 can be equal to or less than 100 percent due to gaps or spaces 815 between adjacent lights streams 806. For example, a second set 817 of light beams includes wider gaps between light beams than the gaps between 816 a first set 816 of light beams. The gaps 815 represent light from the scene directed toward the light guide 801 but which is not reflected by the facets 812. Non-captured light passes through the light guide 801, is scattered or is otherwise lost from the system 800. By way of example, the percentage of coverage at the second eye relief distance 809 is approximately 63 percent at a second light guide thickness 805-2 of 3.5 mm. Other captured percentages based on the system 800 of FIG. 8 are possible based on adjusting one or more aspects in view of exigent circumstances related to the scene to be captured.

Figure 9:
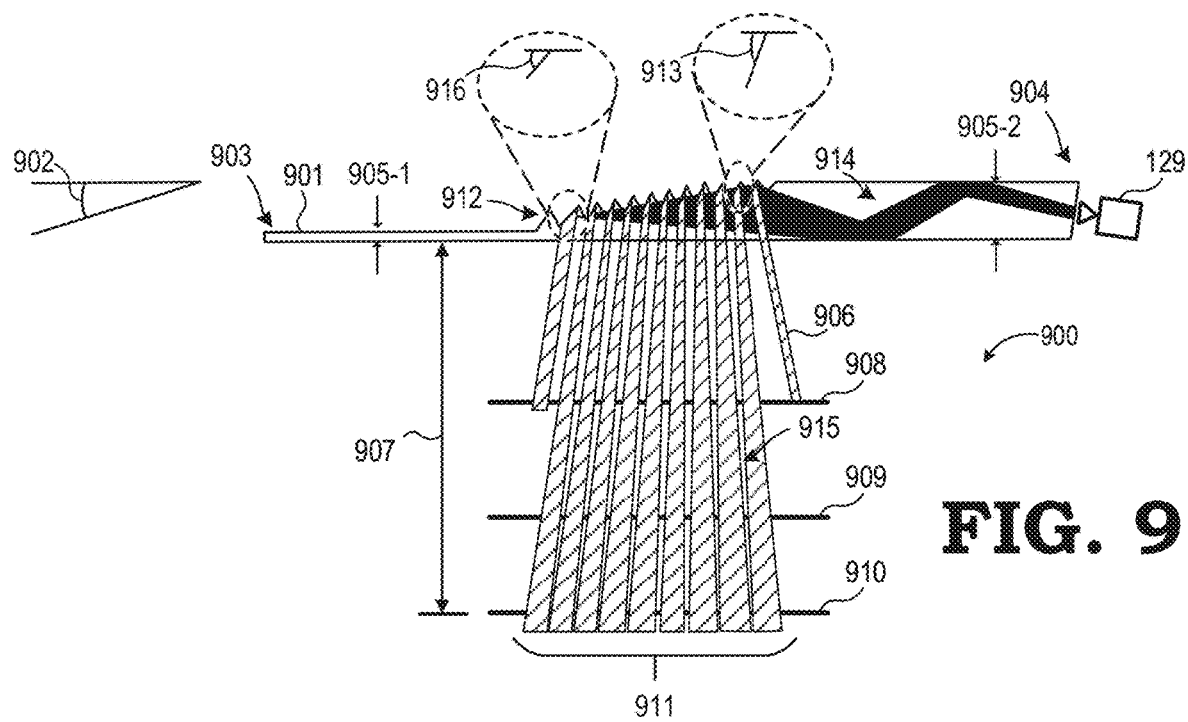
FIG. 9 is a diagram illustrating a light guide having facets of a non-uniform aspect oriented at a non-zero angle in accordance with some embodiments.

FIG. 9 is a diagram illustrating a light guide having facets of a non-uniform aspect oriented at a non-zero angle in accordance with some embodiments. The system 900 includes a light guide 901 with facets 912 located in a combiner region where the combiner region is oriented at a non-zero angle 902. For sake of simplicity of illustration, elements such as one or more coatings and a compensator are omitted but may be included with the light guide 901 to form a faceted light guide assembly. In FIG. 9, the light guide 901 has a first thickness 905-1 along a first end 903, a generally tapered thickness along a combiner region, and a second thickness 905-2 along a second end 904. As an example, the first thickness 905-1 is less than 1.0 mm or less than 0.5 mm. As another example, the second thickness 905-2 has a greater thickness than the first thickness 905-1 such as 1.0 mm, 1.5 mm, 2.0 mm, 2.5 mm, 3.0 mm, 3.5 mm, 4.0 mm, 4.5 mm, 5.0 mm, 7.5 mm, and 10.0 mm. The light guide 901 includes a plurality of facets 912. Each facet 912 has one or more non-uniform aspects. For example, each facet 912 has a different facet angle or a non-uniform facet width. In FIG. 9, a first facet 913 has a first facet angle greater than a second facet angle of a second facet 916.

The facets 912 direct light streams 906 from a scene into the body 914 of the light guide 901. The image sensor 129 captures the internally reflected light. The internally reflected light may be IR light, ultraviolet light, and so forth. An image based on the light streams 906 is dependent on an eye relief distance 907 from a first surface of the light guide 901. The eye relief distance 907 may be a first eye relief distance 908, a second eye relief distance 909, a third eye relief distance 910, and so forth. By way of example, the first eye relief distance 908 is approximately 10 mm, the second eye relief distance 909 is approximately 19 mm, and the third eye relief distance 910 is approximately 28 mm.

At each eye relief distance 907, a certain percentage of the original scene is captured by the image sensor 129 by the collection 911 of the light streams 906. In the configuration illustrated in FIG. 9, the percentage at each eye relief distance 907 is less than 100 percent due to gaps or spaces 915 between adjacent lights streams 906. The gaps 915 represent light from the scene directed toward the light guide 901 but which is not reflected by the facets 912. By way of example, the percentage of coverage at the second eye relief distance 909 is approximately 85 percent at a second light guide thickness 905-2 of 3.5 mm. Other captured percentages based on the system 900 of FIG. 9 are possible based on adjusting one or more aspects of the system 900 in view of exigent circumstances related to the scene to be captured.

Figure 10:
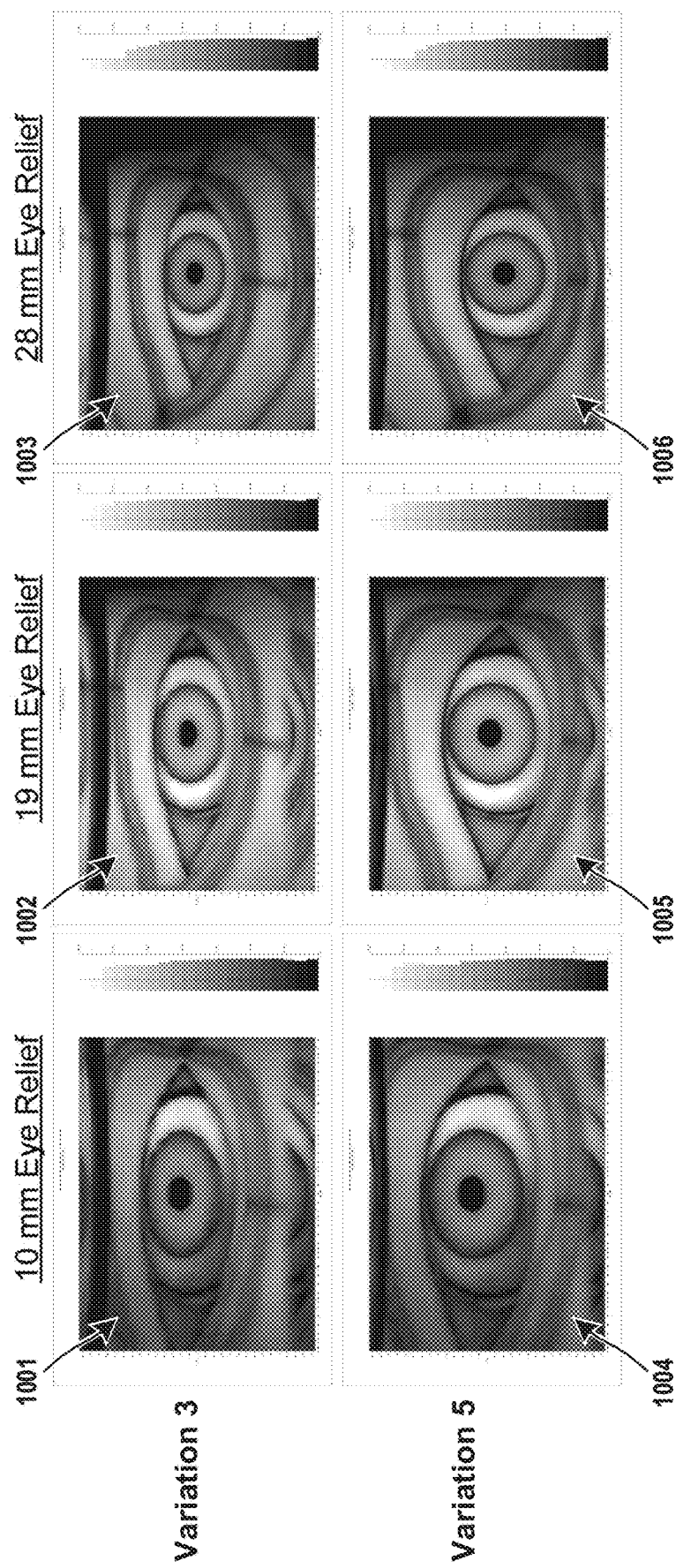
FIG. 10 illustrates example grayscale images captured using implementations of the faceted light guide assemblies of FIGS. 8 and 9.

FIG. 10 illustrates example grayscale images captured using implementations of the faceted light guide assemblies 800, 900 of FIGS. 8 and 9. Images 1001, 1002, and 1003 are for variation 3 corresponding to the faceted light guide assembly 800 of FIG. 8. Images 1004, 1005, and 1006 are for variation 5 corresponding to the faceted light guide assembly 900 of FIG. 9. Refer to FIG. 13 for a summary of variations 3 and 5.

In FIG. 10, a first image 1001, a second image 1002, and a third image 1003 are captured by the faceted light guide assembly 800 of FIG. 8. The faceted light guide assembly 800 has a second light guide thickness 805-2 of 3.5 mm, substantially parallel facet angles, and a facet pitch of 1.3 mm. The faceted light guide assembly 800 generates a FOV gap width of approximately 0.8 mm at 19 mm eye relief (ER). The first image 1001 illustrates a FOV coverage of 57 percent at 10 mm ER. The second image 1002 illustrates a FOV coverage of 63 percent at 19 mm ER. The third image 1003 illustrates a FOV coverage of 71 percent at 28 mm ER.

A fourth image 1004, a fifth image 1005, and a sixth image 1006 are captured by the faceted light guide assembly 900 illustrated in FIG. 9. The faceted light guide assembly 900 has a second light guide thickness 905-2 of 3.5 mm, non-parallel facet angles, and a facet pitch of 1.3 mm. The faceted light guide assembly 900 generates a FOV gap width of approximately 0.32 mm at 19 mm ER. The fourth image 1004 illustrates a FOV coverage of 68 percent at 10 mm ER. The fifth image 1005 illustrates a FOV coverage of 85 percent at 19 mm ER. The sixth image 1006 illustrates a FOV coverage of 96 percent at 28 mm ER.

Figure 11:
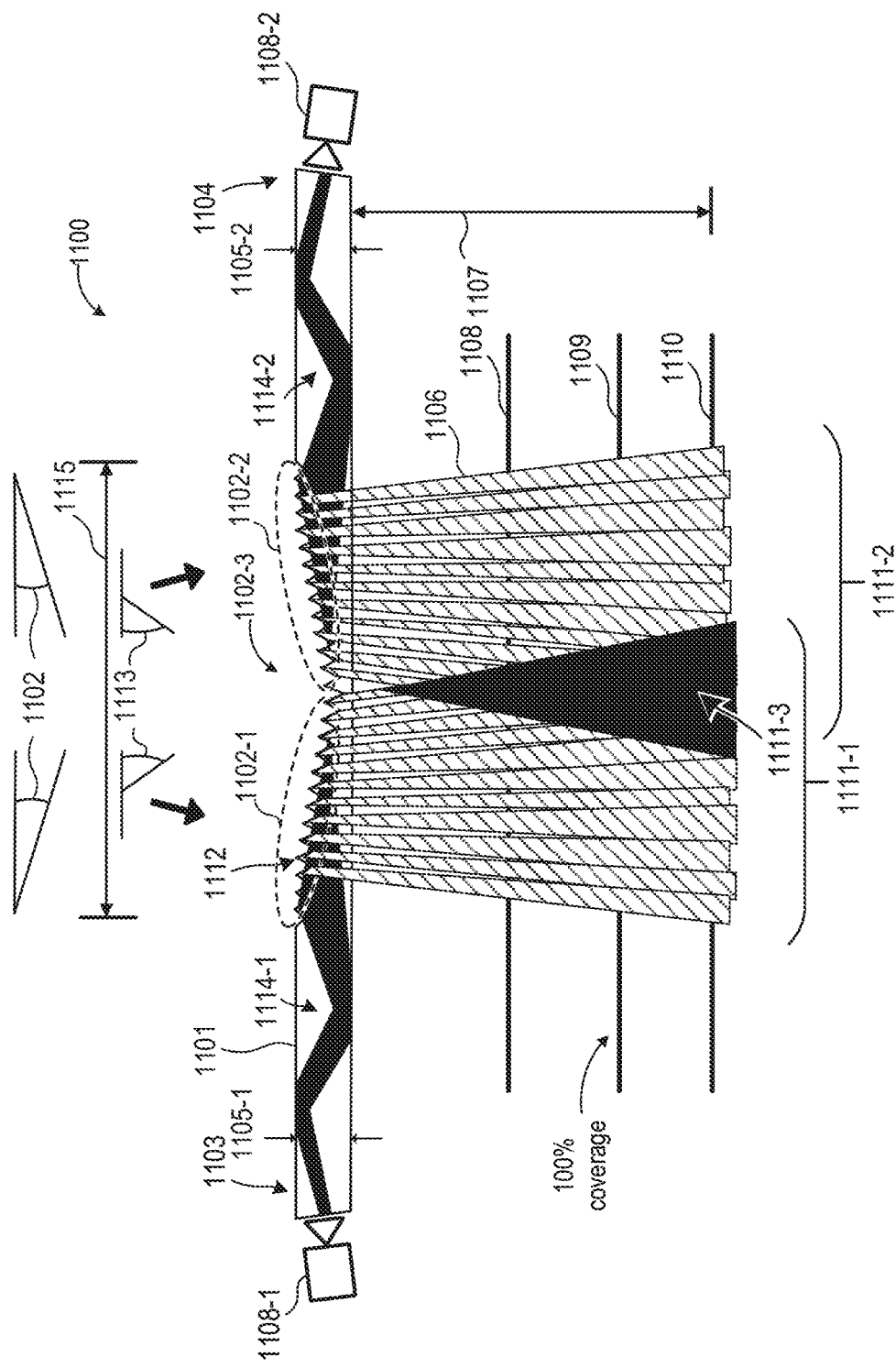
FIG. 11 is a diagram illustrating a light guide assembly including two light guides in one element in accordance with some embodiments.

FIG. 11 is a diagram illustrating a light guide assembly including two light guides in one element in accordance with some embodiments. In FIG. 11, the element having facets of a uniform aspect, and where the facets are in combiner regions that are oriented at a non-zero angle.

For sake of simplicity of illustration, elements such as one or more coatings and a compensator are omitted from FIG. 11 but may be included with the light guide 1101.

In FIG. 11, the light guide 1101 has a first thickness 1105-1 along a first end 1103 proximate to a first image sensor 1108-1. The light guide 1101 also has a second thickness 1105-2 along a second end 1104 proximate to a second image sensor 1108-2. The light guide 1101 directs light left and right along the internal body regions 1114-1, 1114-2 of the light guide 1101 to the respective image sensors 1108-1, 1108-2.

The light guide 1101 includes a center section having two sets of facets 1112. The facets 1112 lie along two non-zero-angle combiner regions 1102-1, 1102-2 of the top surface of the light guide 1101. The first combiner region 1102-1 and the second combiner region 1102-2 are tilted a same angle 1102 toward the center point 1102-3 thereby allowing the facets 1112 to direct reflected light 1106 toward the respective image sensors 1108-1, 1108-2. The first combiner region 1102-1 is for a first eye and the second combiner region 1102-2 is for a second eye. In FIG. 11, each facet 1112 has at least one uniform attribute such as a same facet angle 1113.

A front surface of the eyes (not illustrated) would touch a plane lying perpendicular to FIG. 11 at an eye relief (ER) distance 1107 such as at a first ER distance 1108, a second ER distance 1109, a third ER distance 1110, and so forth. As examples, the first ER distance 1108 can be 10 mm, the second ER distance 1109 can be 19 mm, and the third ER distance 1110 can be 28 mm. According to one embodiment, each percentage of the original scene captured by the image sensors 1108-1, 1108-2 is 100 percent at the second ER distance 1109.

According to at least one embodiment, a lateral position of each of the facets 1112 is selected so as to maximize a FOV coverage of the scene of each eye at an ER distance 1107 away from the bottom surface of the light guide 1112. The facets 1112 are formed within a facet range 1115 at a central portion of the light guide 1101. The first combiner region 1102-1 includes facets that reflect light from a first FOV 1111-1. The second combiner region 1102-2 includes facets that reflect light from a second FOV 1111-2. According to at least one embodiment, tuning the features of the facets 1112 can result in an overlap field of view or overlap FOV 1111-3 where the subject matter is captured by both the first image sensor 1108-1 and the second image sensor 1108-2. Information from this overlap FOV 1111-3 can be used for improved accuracy of identifying an aspect or a feature of an eye for eye tracking purposes.

According to at least one embodiment, a thickness of the light guide 1101 at the center point is less than approximately 1.0 and can be less than 0.5 mm. The first thickness 1105-1 may have a same value or a different value as the second thickness 1105-2. As an example, the light guide thicknesses 1105-1, 1105-2 have a value of 2.5 mm. In other examples, the light guide thicknesses 1105-1, 1105-2 have a value of 1.0 mm, 1.5 mm, 2.0 mm, 2.5 mm, 3.0 mm, 3.5 mm, 4.0 mm, 4.5 mm, 5.0 mm, 7.5 mm, and 10.0 mm. Based on the light guide thicknesses 1105-1, 1105-2, and one or more aspects of the facets 1112, a FOV coverage may be altered and tuned to a specific need or use.

Figure 12:
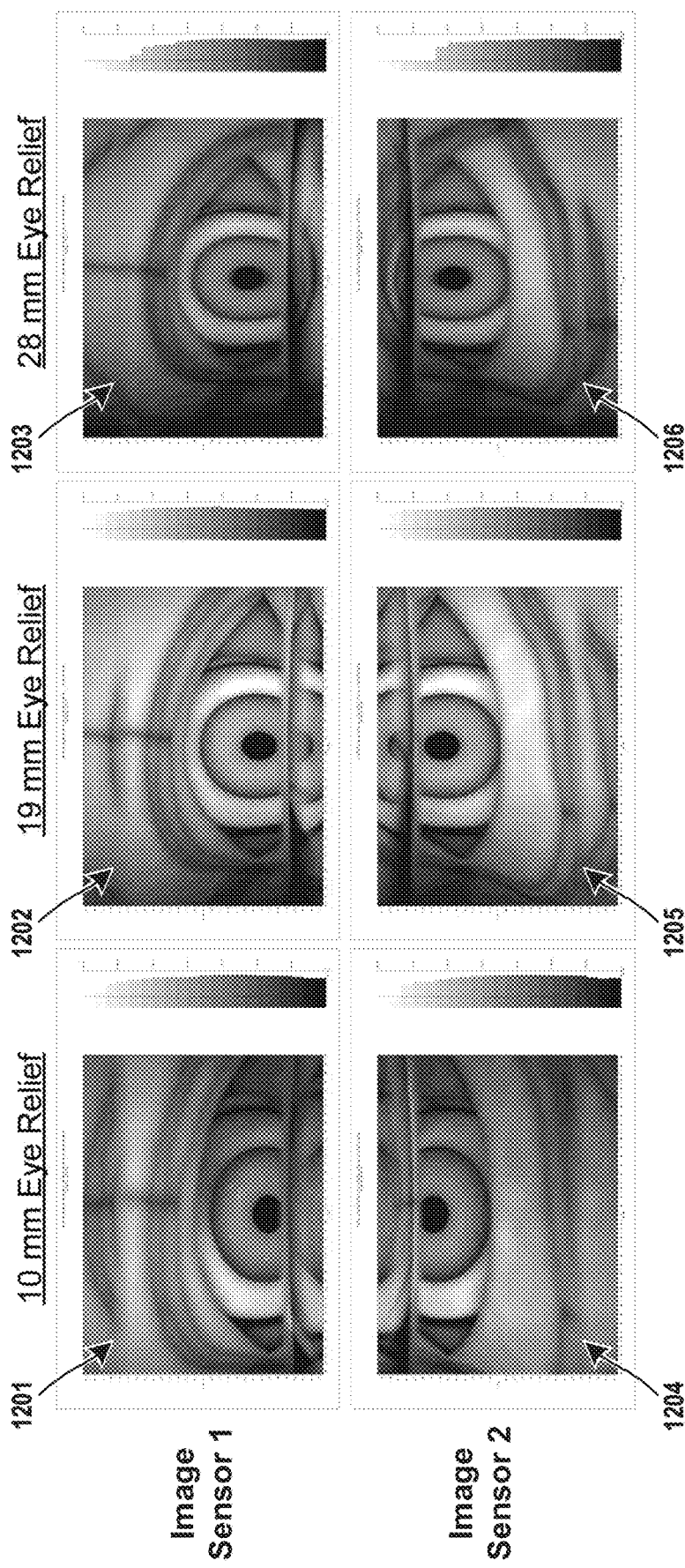
FIG. 12 illustrates example grayscale images captured using implementations of the faceted light guide assembly of FIG. 11.

FIG. 12 illustrates example grayscale images captured using implementations of the faceted light guide assembly of FIG. 11. In FIG. 12, the light guide thicknesses 1105-1, 1105-1 are 2.5 mm. Three images 1201, 1202, and 1203 are captured by a first image sensor ("Image Sensor 1" in FIG. 12), such as the first image sensor 1108-1, at each of three eye relief (ER) distances: 10 mm ER, 19 mm ER, and 28 mm ER. Three images 1204, 1204, and 1204 are captured by a second image sensor ("Image Sensor 2" in FIG. 12), such as the second image sensor 1108-2, at each of three eye relief (ER) distances: 10 mm ER, 19 mm ER, and 28 mm ER.

FIG. 13 illustrates a table of example values of system aspects and respective values for field of view (FOV) coverage for systems as described herein for eye tracking. In FIG. 13, according to a first configuration or variation 1301 of an eye tracking system, a light guide thickness is 2.0 mm, facets are parallel with each other, a facet pitch is 1.4 mm, and the FOV gap width is approximately 1.2 mm at a 19 mm eye relief (ER) distance. For the first variation 1301, a FOV coverage is 30 percent at a 10 mm ER, 36 percent at 19 mm ER, and 40 percent at 28 mm ER.

According to a second variation 1302 of an eye tracking system, a light guide thickness is 2.5 mm, facets are non-parallel with respect to each other, a facet pitch is 1.4 mm, and the FOV gap width is approximately 0.45 mm at a 19 mm ER distance. For the second variation 1302, a FOV coverage is 44 percent at a 10 mm ER, 65 percent at 19 mm ER, and 89 percent at 28 mm ER.

According to a third variation 1303 of an eye tracking system, a light guide thickness is 3.5 mm, facets are parallel to each other, a facet pitch is 1.3 mm, and the FOV gap width is approximately 0.8 mm at a 19 mm ER distance. For the third variation 1303, a FOV coverage is 57 percent at a 10 mm ER, 63 percent at 19 mm ER, and 71 percent at 28 mm ER.

According to a fourth variation 1304 of an eye tracking system, a light guide thickness is 2.5 mm, facets are parallel to each other, a facet pitch is 1.4 mm, and the FOV gap width is approximately 1.0 mm at a 19 mm ER distance. For the fourth variation 1304, a FOV coverage is 42 percent at a 10 mm ER, 47 percent at 19 mm ER, and 54 percent at 28 mm ER.

In FIG. 13, according to a fifth variation 1305 of an eye tracking system, a light guide thickness is 3.5 mm, facets are non-parallel with respect to each other, a facet pitch is 1.3 mm, and the FOV gap width is approximately 0.32 mm at a 19 mm ER distance. For the fifth variation 1305, a FOV coverage is 68 percent at a 10 mm ER, 85 percent at 19 mm ER, and 96 percent at 28 mm ER.

According to a sixth variation 1306 of an eye tracking system, a light guide thickness is 2.5 mm, facets are non-parallel with respect to each other, a facet pitch is 1.0 mm, and the FOV gap width is approximately 0.0 mm at a 19 mm ER distance. For the sixth variation 1306, a FOV coverage is 86 percent at a 10 mm ER, 100 percent at 19 mm ER, and 100 percent at 28 mm ER.

Figure 14:
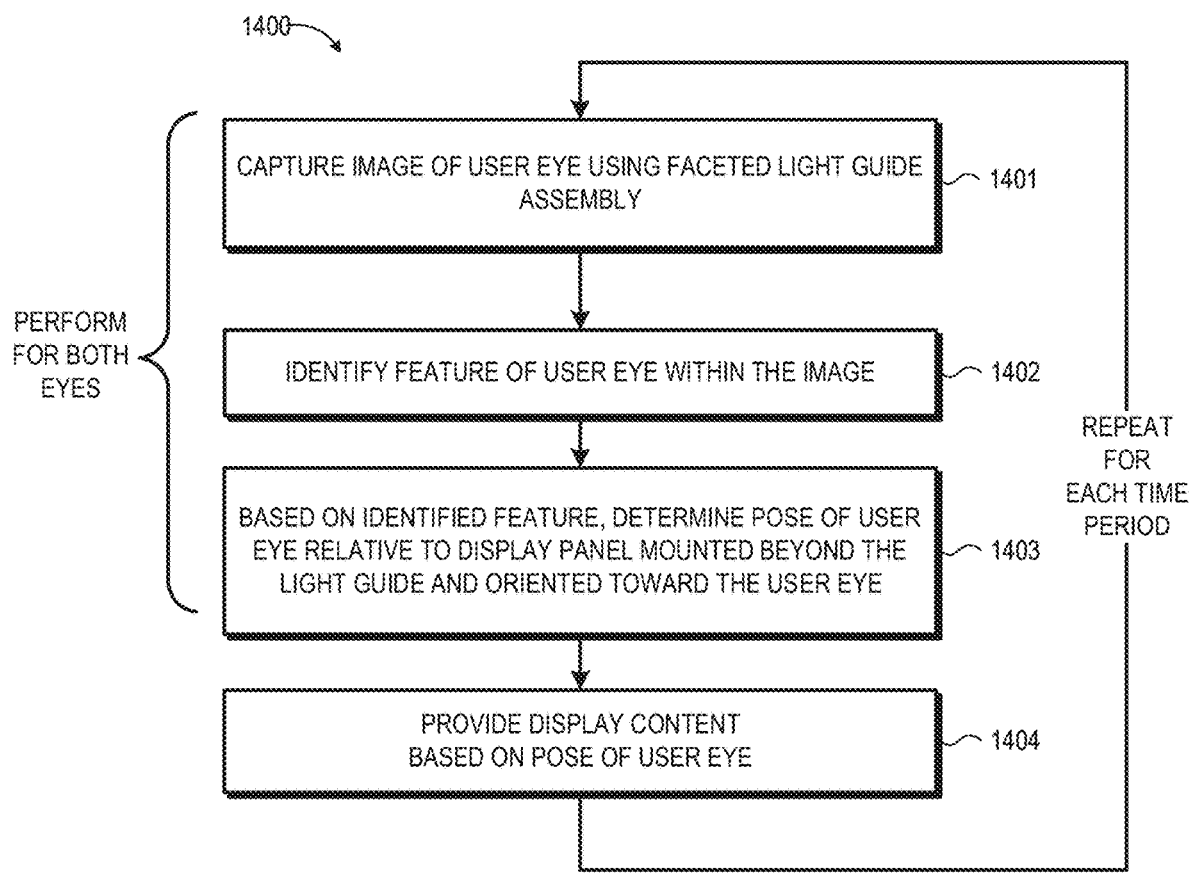
FIG. 14 is an example method for eye tracking using a faceted light guide assembly in accordance with some embodiments.

FIG. 14 is an example method 1400 for eye tracking using a faceted light guide assembly in accordance with some embodiments. In FIG. 14, operation 1401 includes capturing, with an image sensor oriented at a surface of a light guide, an image from or based on the facets of a set of facets formed in a surface of the light guide, each facet surface positioned adjacent to a portion of a compensator coated with an IR light-reflecting material. Operation 1402 includes identifying a feature of a user eye within the image. Operation 1403 includes determining a pose of the user eye relative to a display panel mounted beyond the light guide and oriented toward the user eye, the pose determined based on the identified feature of the user eye. Operation 1404 includes providing display content, such as at a first position on the display panel, based on the pose of the user eye. One or more other operations may be performed in addition to those described as part of the method 1400. For example, the method may include capturing, with a second image sensor oriented at a first surface of a second light guide, a second image during a same time period as capture of the first image. The second image captures information from a second user eye.

Figure 15:
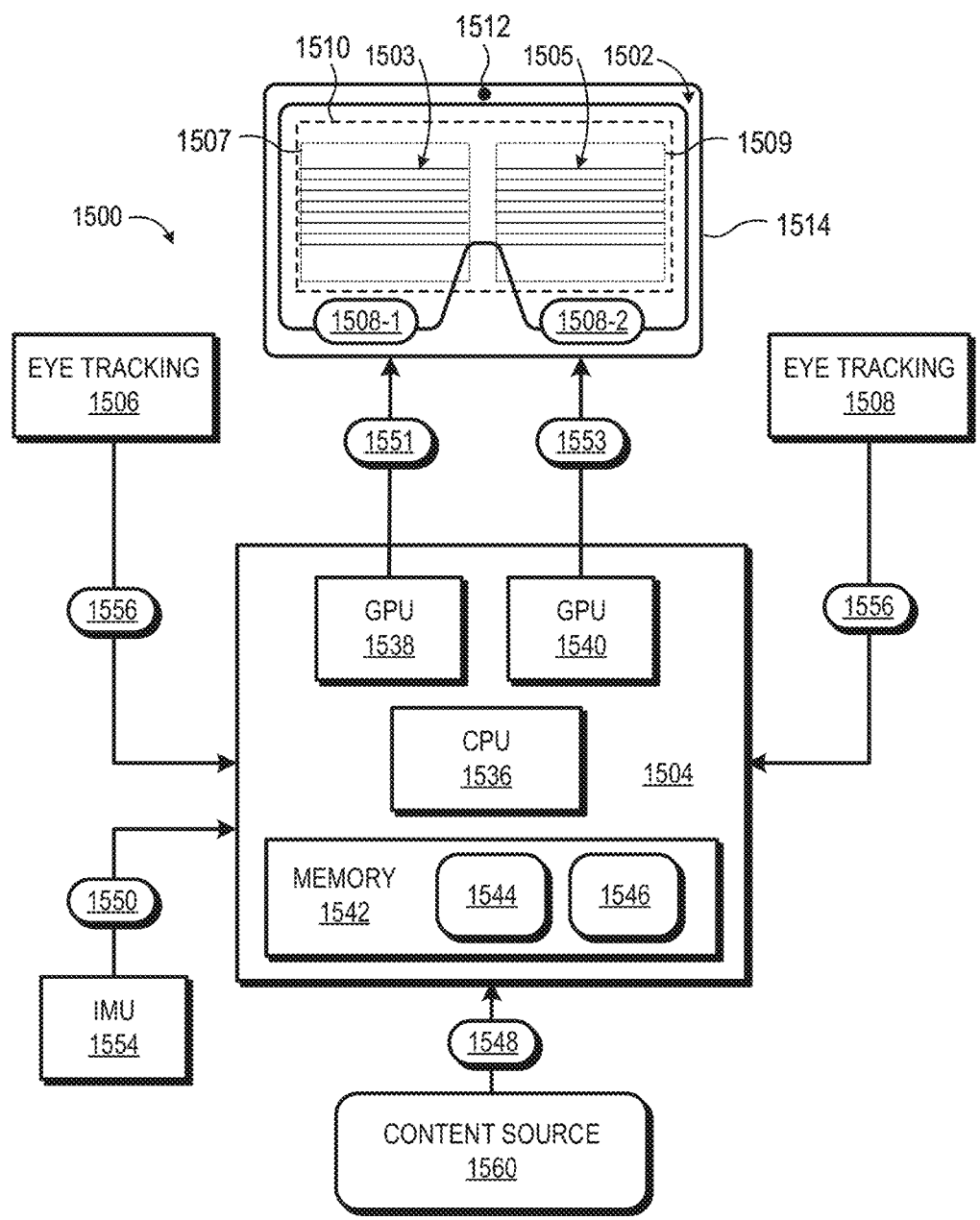
FIG. 15 illustrates a faceted light guide assembly for eye tracking in accordance with some embodiments.

FIG. 15 illustrates a system 1500 that includes a faceted light guide assembly for eye tracking in accordance with at least one embodiment. In the depicted example, the system 1500 includes a display sub-system 1502, a rendering component 1504, and one or more eye tracking components, such as one or both of a first eye tracking component 1506 for tracking a left user eye and a second eye tracking component 1508 for tracking a right user eye. The display sub-system 1502 includes a display panel 1510 mounted in an apparatus 1514 (e.g., goggles, glasses, headset, head mounted display (HMD)) that places the display 1510 in front of the left user eye and the right user eye.

The display sub-system 1502 includes a first or left faceted light guide assembly 1503 across a left field of view 1507, and a second or right faceted light guide assembly 1505 across a right field of view 1509. The left facets of the left faceted light guide assembly 1503 direct light reflected from the left eye into a light guide (not numbered) internally toward a first image sensor 1508-1. The right facets of the right faceted light guide 1505 direct light reflected from the right eye into the light guide internally toward a second image sensor 1508-2.

As also shown in FIG. 15, the rendering component 104 includes a set of one or more processors, such as the illustrated central processing unit (CPU) 1536 and graphics processing units (GPUs) 1538, 1540 and one or more storage components, such as system memory 1542, to store software programs or other executable instructions that are accessed and executed by the processors 1536, 1538, 1540 so as to manipulate the one or more of the processors 1536, 1538, 1540 to perform various tasks as described herein. Such software programs include, for example, a rendering program 1544 comprising executable instructions for providing content to the display 1510, as well as an eye tracking program 1546 comprising executable instructions for an eye tracking process.

In operation, the rendering component 1504 receives rendering information or display content 1548 from a local or remote content source 1560, where the rendering information 1548 represents graphics data, video data, or other data representative of an object or scene that is the subject of imagery to be rendered and displayed at the display sub-system 1502. Executing the rendering program 1544, the CPU 1536 uses the rendering information 1548 to send drawing instructions to the GPUs 1538, 1540. As part of this rendering process, the CPU 1536 may receive pose information 1550 from an inertial management unit (IMU) 1554, whereby the pose information 1550 is representative of a pose of the display sub-system 1502 and control the rendering of one or more lightfield frames to reflect a viewpoint of an object or scene from the pose on the display panel 1510.

The rendering component 1504 further may use eye pose information from one or both of the eye tracking components 1506, 1508 to control or otherwise interact with content displayed on the display panel 1510. To this end, the eye tracking components 1506, 1508 each may include one or more infrared (IR) light sources 1512 (e.g., IR illuminators, IR lights, IR LEDs) to illuminate the eyes with IR light. Eye information 1556 is gathered from a corresponding eye so as to determine a current position, current orientation, or both (singularly or collectively referred to herein as "pose") of the corresponding eye from one or more captured eye images, such as a composite eye image, captured from the image sensors 1508-1, 1508-2. Any of a variety of eye tracking apparatuses and techniques may be employed as the eye tracking components 1546, 1548 to track one or both eyes of the user.

In at least one embodiment, the near-eye display system 1500 may determine an eye pose as a past eye pose, a current eye pose, or a predicted (future) eye pose, or a combination thereof. In particular, a prediction of a future eye pose may provide improved performance or response time, and any of a variety of eye-movement prediction algorithms may be implemented to predict a future eye pose. Moreover, in some instances, the eye-tracking components may use scene information (e.g., location of faces within the imagery to be rendered or saliency heuristics) as input in prediction of a future gaze of the user's eyes for eye pose calculation. As such, the term "eye pose", as used herein, may refer to a previous, current, or predicted eye pose, or some combination thereof.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

The various embodiments of the present disclosure illustrate the implementation of an eye tracking system that reduces an eye relief distance. The system includes at least a light guide with facets that internally reflect light and capturing light with an image sensor positioned adjacent a side of the light guide. A compensator, having a surface complementary to a surface of the light guide, may be placed adjacent to the light guide. A faceted light guide assembly includes a light guide, an IR reflector, and a compensator.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. An eye tracking optic comprising:
a light source configured to be positioned proximate to a user eye and configured to direct light towards the user eye;
a light guide having
a body,
a first eye-facing surface,
a second surface opposite the first surface,
a third surface of the light guide between the first surface and the second surface, and
a plurality of facets formed in the second surface over a combiner region, each facet having a facet surface oriented at a facet angle relative to the first surface, wherein each of the facets is configured to reflect a portion of light incident on the user eye into the body of the light guide toward the third surface of the light guide; and
a first infra-red (IR) light reflector positioned adjacent the facet surfaces of the plurality of facets.

2. The eye tracking optic of claim 1, further comprising:
a second IR light reflector positioned adjacent the second surface of the light guide between the plurality of facets of the combiner region and the third surface, the second IR light reflector to reflect IR light into the body of the light guide.

3. The eye tracking optic of claim 1, wherein the first IR light reflector is a coating applied to the second surface of the light guide over at least one of the plurality of facets.

4. An eye tracking system comprising:
a light guide configured to be disposed between a user eye and a display, the light guide comprising a transparent body having:
a first surface, a second surface opposite the first surface, and a third surface between the first surface and the second surface;
the first surface composed of a substantially planar surface; and
the second surface comprising a combiner region having a plurality of facets arranged along a plane, wherein the plane has a non-zero angle relative to the first surface, and wherein the plurality of facets are configured to reflect light incident on a corresponding region of the first surface internally through the body toward the third surface.

5. The eye tracking system of claim 4, further comprising:
at least one light source to illuminate the user eye; and
an imaging sensor facing the third surface and configured to capture imagery of the eye representative of light from the at least one light source reflected from the user eye and incident on the first surface of the light guide.

6. The eye tracking system of claim 5, further comprising:
a first light-reflecting coating on the combiner region of the second surface of the light guide, the first coating to reflect light from the user eye toward the imaging sensor along the body of the light guide toward an end facet of the light guide, and the first coating allowing visible light to pass through the first coating.

7. The eye tracking system of claim 4, further comprising:
a transparent compensator, positioned proximate the second surface of the light guide, the compensator comprising a first surface shaped complementary to the second surface of the light guide.

8. The eye tracking system of claim 4, further comprising:
an infrared (IR) light source positioned to direct IR light onto the user eye, the IR light reflected into the body of the light guide by the plurality of facets of the second surface.

9. The eye tracking system of claim 4, wherein the combiner region has zero optical-power for the user eye.

10. The eye tracking system of claim 4, wherein the facet pitch of a plurality of the facets are a same pitch.

11. The eye tracking system of claim 4, wherein a first facet pitch of a first facet of the plurality of facets is different from facet pitches of the other facets of the plurality of facets.

12. The eye tracking system of claim 4, further comprising:
a second reflective coating on a second region outside of the combiner region on the second surface of the light guide, the second reflective coating reflecting IR light.

13. The eye tracking system of claim 4, wherein the light guide is configured to redirect light incident on at least a portion of the first surface toward the third surface via total internal reflection.

14. A system comprising:
a light source configured to be positioned proximate to a user eye and configured to direct light towards the user eye;
a light guide having a body, a first surface configured to be oriented toward a user, a second surface configured to be oriented away from the user, a third surface of the light guide, and a plurality of facets formed in the second surface over a combiner area, each facet having a facet surface and a facet pitch angle, each of the facets configured to reflect a portion of infra-red (IR) light incident on the user eye into the body of the light guide and toward the third surface of the light guide;
a light-reflecting material placed proximate to the combiner area of the second surface of the light guide, the light-reflecting material configured to reflect IR light from the user eye toward the third surface along the body of the light guide, and the light-reflecting material configured to allow at least a portion of visible light to pass through the light-reflecting material;

an image sensor oriented toward the third surface of the light guide;

a processor coupled to the image sensor; and a storage component, coupled to the processor, to store executable instructions, the executable instructions including:

instructions to manipulate the processor to capture an image of the user eye via the third surface of the light guide; and instructions to manipulate the processor to locate an element of the user eye in the image.

15. The system of claim 14, further comprising a transparent compensator, positioned proximate the second surface of the light guide, comprising a first surface oriented toward the second surface of the light guide, and a second surface oriented away from the user.

16. The system of claim 14, wherein the light source is an IR light source.

17. The system of claim 14, further comprising:
a display panel positioned beyond the second surface of the light guide, the display panel oriented toward the user eye, the display panel configured to provide electronic images to the user eye.

18. The system of claim 14, wherein the light guide is positioned across a field of view (FOV) of the user eye, and wherein the image sensor is placed at a location outside the FOV of the user eye.

19. The system of claim 18, wherein at least two of the plurality of facets are positioned within the FOV of the user eye.

20. The system of claim 14, wherein a first facet pitch angle of a first facet of the plurality of facets is a same pitch angle as a second pitch angle of a second facet of the plurality of facets.

21. The system of claim 14, wherein a first facet surface of a first facet of the plurality of facets is planar over an entirety of the first facet.

22. The system of claim 14, wherein a first facet surface of a first facet of the plurality of facets extends from a first side of a field of view (FOV) of the user eye to a second and opposing second side of the FOV of the user eye.

23. In a near-eye display system, a method comprising:
providing a light guide disposed between a first user eye and a display of the near-eye display system, the light guide comprising a body, a first surface disposed toward the first user eye, a second surface having a first plurality of facets, each facet oriented at a respective pitch angle thereby reflecting light internally into the body of the light guide and toward a third surface disposed between the first surface and the second surface;

capturing, via an imaging sensor facing the third surface of the light guide, an image of the first user eye from light from a light source positioned proximate to the first user eye, wherein the light is reflected from the first user eye and incident on the first surface of the light guide; and determining a pose of the first user eye based at least in part on the captured image of the first user eye.

24. The method of claim 23, wherein the image is derived from infrared (IR) light provided by an IR light source mounted proximate to the first user eye.

25. The method of claim 23, further comprising:
rendering imagery for display at a display panel based on the pose of the first user eye.

26. The method of claim 23, further comprising:
capturing, with a second image sensor oriented at a fourth surface of a second light guide, a second image, from a second plurality of facets of the second surface of the light guide, each facet of the second plurality of facets at a respective pitch angle thereby reflecting light internally into the body of the light guide and toward the fourth surface disposed between the first surface and the second surface; and prior to determining the pose of the first user eye, modifying the image of the first user eye based on the second image.

27. The method of claim 23, further comprising:
capturing, with a second image sensor oriented at a fourth surface of a second light guide, a second image of a second user eye from light reflected from the second user eye and incident on the first surface of the light guide, via a second plurality of facets of the second surface of the light guide, each facet of the second plurality of facets at a respective pitch angle thereby reflecting light internally into the body of the light guide and toward the fourth surface disposed between the first surface and the second surface; and determining a pose of the second user eye based at least in part on the captured image of the second user eye.

* * * * *